(12) United States Patent
Wurm et al.

(10) Patent No.: US 7,231,717 B2
(45) Date of Patent: Jun. 19, 2007

(54) METHOD OF ASSEMBLING A DOOR

(75) Inventors: Georg Wurm, Bad Homburg (DE);
Daniel Drewniok, Frankfurt (DE);
Harald Koellner, Altenstadt (DE);
Klaus Dieter Strauss, Brounschweig (DE); Kenneth W. Schang, Plymouth, MI (US); Arnd Herwig, Baumach (DE); Simon Blair Dobson, Kent (GB);
Rainer W. Grimm, Frankfurt (DE);
Gregory Keyes, Birmingham (GB);
Patrick Hof, Marburg (DE)

(73) Assignee: Meritor Light Vehicle Systems - France, Sully-sur-Loire (FR)

( * ) Notice: Subject to any disclaimer, the term of this patent is extended or adjusted under 35 U.S.C. 154(b) by 117 days.

(21) Appl. No.: 10/023,479

(22) Filed: Dec. 13, 2001
(Under 37 CFR 1.47)

(65) Prior Publication Data

US 2002/0162208 A1 Nov. 7, 2002

(30) Foreign Application Priority Data

Dec. 14, 2000 (GB) ................... 0030529.2

(51) Int. Cl.
*B21D 53/88* (2006.01)
*B23P 25/00* (2006.01)
(52) U.S. Cl. .................... 29/897.2; 29/469; 29/458; 296/146.2
(58) Field of Classification Search ............... 29/897.2, 29/430, 460, 469, 434, 794, 791; 296/146.2, 296/146.5, 146.6, 146.7; 49/502
See application file for complete search history.

(56) References Cited

U.S. PATENT DOCUMENTS

| | | | | | |
|---|---|---|---|---|---|
| 2,757,447 | A | * | 8/1956 | Barenyi | ........................ 29/469 |
| 4,662,115 | A | * | 5/1987 | Ohya et al. | ................... 49/502 |
| 4,711,052 | A | * | 12/1987 | Maeda et al. | ................. 49/502 |
| 4,757,607 | A | * | 7/1988 | Sciaky et al. | ................. 29/771 |
| 4,800,638 | A | | 1/1989 | Herringshaw et al. | |
| 4,845,894 | A | | 7/1989 | Herringshaw et al. | |

(Continued)

FOREIGN PATENT DOCUMENTS

| | | |
|---|---|---|
| DE | 34 02 135 A1 | 7/1985 |
| DE | 195 37 504 A1 | 4/1997 |
| EP | 0 170 150 A1 | 2/1986 |

(Continued)

OTHER PUBLICATIONS

Search Report under Section 17, Date of Search: Jun. 13, 2001.
European Search Report, May 30, 2003.

*Primary Examiner*—Marc Jimenez
(74) *Attorney, Agent, or Firm*—Carlson, Gaskey & Olds (57) ABSTRACT

A method of assembling of a door comprising the steps of providing a door inner panel having an outer face and an inner face, at least one functional component of the door, an anti intrusion beam and a door outer panel. The functional component is assembled onto and towards the outer face. The anti intrusion beam is assembled towards the outer face prior to assembling the door outer panel towards the outer face. Fixing means secure the door inner panel, the functional component, the anti intrusion beam and the door outer panel relative to each other.

19 Claims, 6 Drawing Sheets

U.S. PATENT DOCUMENTS

| | | | |
|---|---|---|---|
| 4,866,883 A * | 9/1989 | Brown et al. | 49/502 |
| 4,934,099 A * | 6/1990 | Maekawa et al. | 49/502 |
| 5,226,259 A * | 7/1993 | Yamagata et al. | 49/502 |
| 5,277,470 A * | 1/1994 | Freeman et al. | 296/146.6 |
| 5,351,443 A * | 10/1994 | Kimura et al. | 49/502 |
| 5,355,629 A * | 10/1994 | Kimura et al. | 49/502 |
| 5,573,297 A * | 11/1996 | DeRees et al. | 49/502 |
| 5,809,695 A | 9/1998 | Strickland | |
| 5,857,732 A | 1/1999 | Ritchie | |
| 6,050,029 A | 4/2000 | Simon et al. | |
| 6,164,716 A * | 12/2000 | Palazzolo et al. | 296/187.12 |
| 6,328,359 B1 * | 12/2001 | Pacella et al. | 293/128 |

FOREIGN PATENT DOCUMENTS

| | | |
|---|---|---|
| EP | 0 243 325 A2 | 10/1987 |
| EP | 0 243 325 A3 | 10/1987 |
| EP | 0 336 565 A2 | 10/1989 |
| GB | 2 149 726 A | 6/1985 |
| WO | WO 01/20114 A1 | 3/2001 |

* cited by examiner

METHOD OF ASSEMBLING A DOOR

This application claims priority to United Kingdom (GB) Patent Application No. 0030529.2 filed on Dec. 14, 2000.

BACKGROUND OF THE INVENTION

The present invention relates to a method of assembling a door and a method of assembling a vehicle including a door. In particular, the invention relates to a method of assembling a car (automobile) door.

Known car doors are typically assembled by welding various strengthening and reinforcement elements to an inner panel and then attaching an outer panel to this subassembly by a hemming technique. This bare door is then allocated to a car body along with other bare doors and a bare hood and a bare trunk and this set of components is then painted together to provide the final exterior color for the vehicle. Such a technique ensures that all exterior surfaces of the vehicle are of uniform color since the final coat of paint on all panels is from the same batch of paint.

Subsequently the functional hardware is then installed through holes in the inner panel into the painted doors and water management membrane is applied to this inner panel to close the various access holes.

Finally, a trim panel is fixed to the inner panel to provide a styled aesthetically pleasing surface which incorporates appropriate features such as switches, door pockets, loudspeakers and heater grills.

Thus, the assembly of the door components into the door is from the inside (when considering the associated vehicle). Such an assembly method means that the various door components must be assembled into the door on the vehicle assembly line since all exterior panels are painted together and the door components must be assembled after painting.

An object of the present invention is provide improved method of assembling a door.

SUMMARY OF THE INVENTION

Thus, according to the present invention, there is provided a method of assembling a door comprising the steps of providing a door inner panel having an outer face and an inner face; at least one functional component of the door; anti intrusion beam; a door outer panel, and assembling said at least one functional component on to and towards the outer face. The anti intrusion beam is assembled towards the outer face prior to assembling the door outer panel towards the outer face. The door inner panel, at least one functional component, the anti intrusion beam and the door outer panel are secured relative to each other.

The invention thus allows for the majority of the door components to be assembled onto the door (in particular at a door assembly line) prior to a door outer panel being secured to the door.

BRIEF DESCRIPTION OF THE DRAWINGS

The invention will now be described, by way of example, with reference to the accompanying drawings.

DETAILED DESCRIPTION OF THE PREFERRED EMBODIMENT

Figure 1:
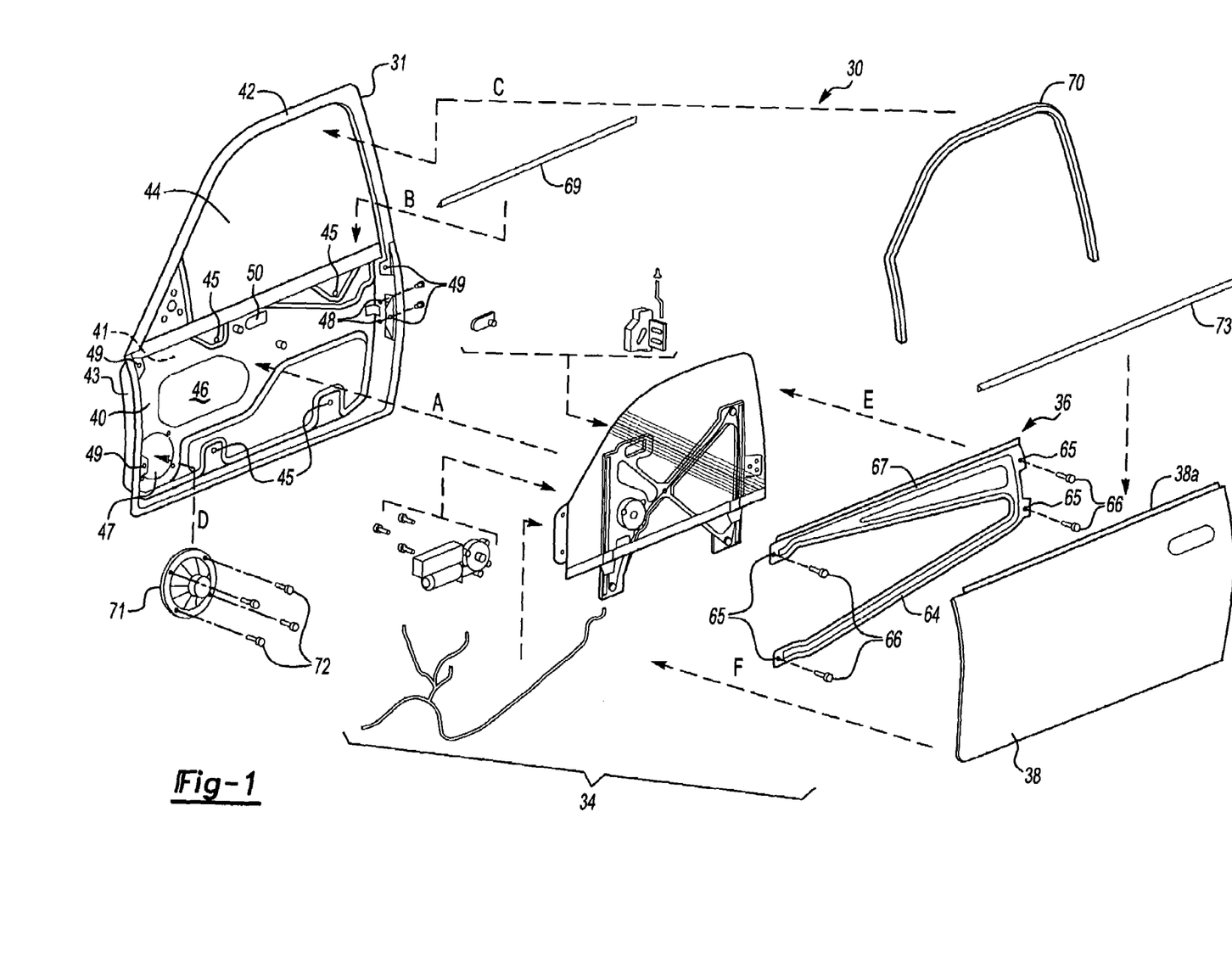
FIG. 1 is an exploded view of a door which can be assembled according to the present invention.
Figure 2:
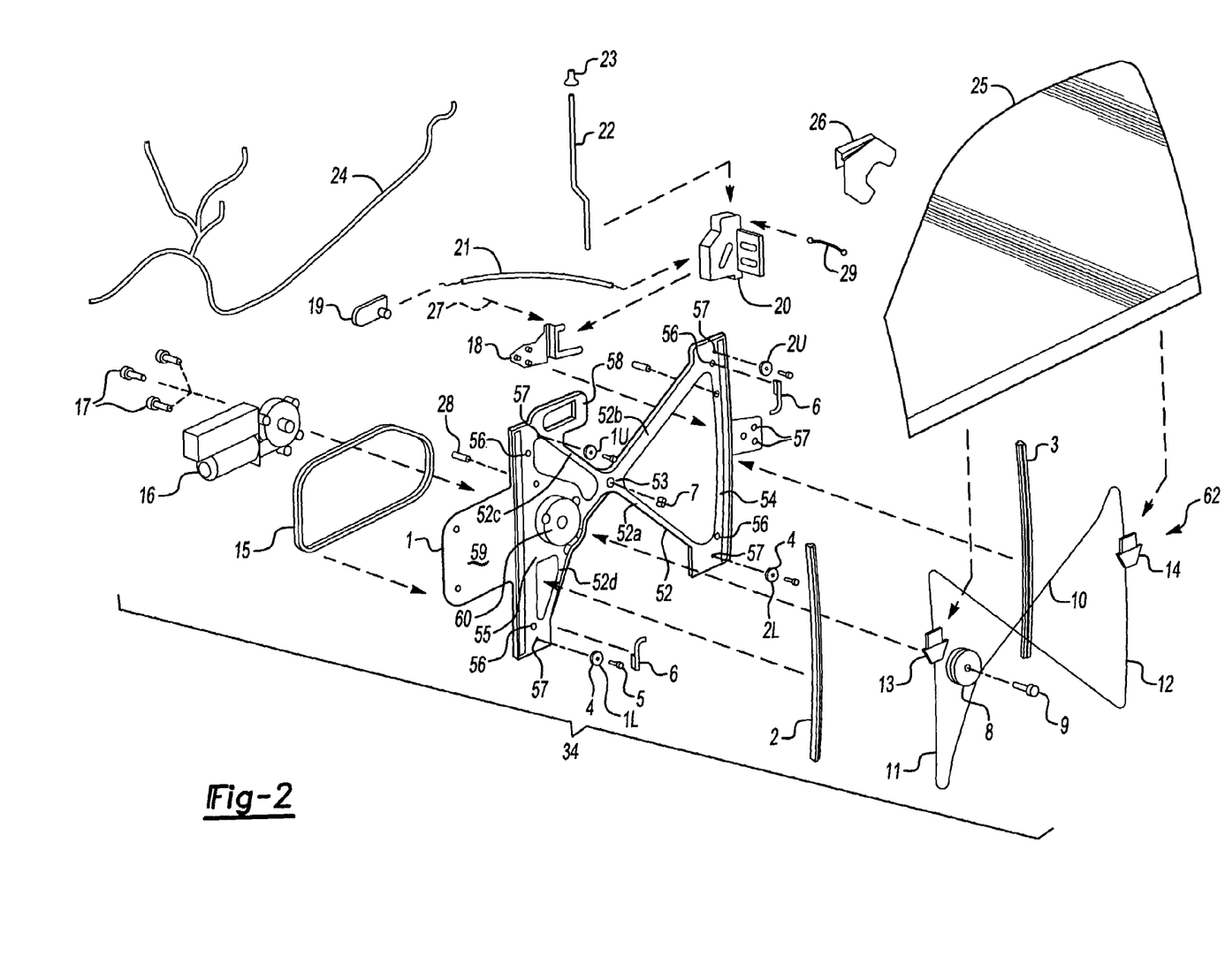
FIG. 2 is an exploded view of the window regulator components of FIG. 1.
Figure 3:
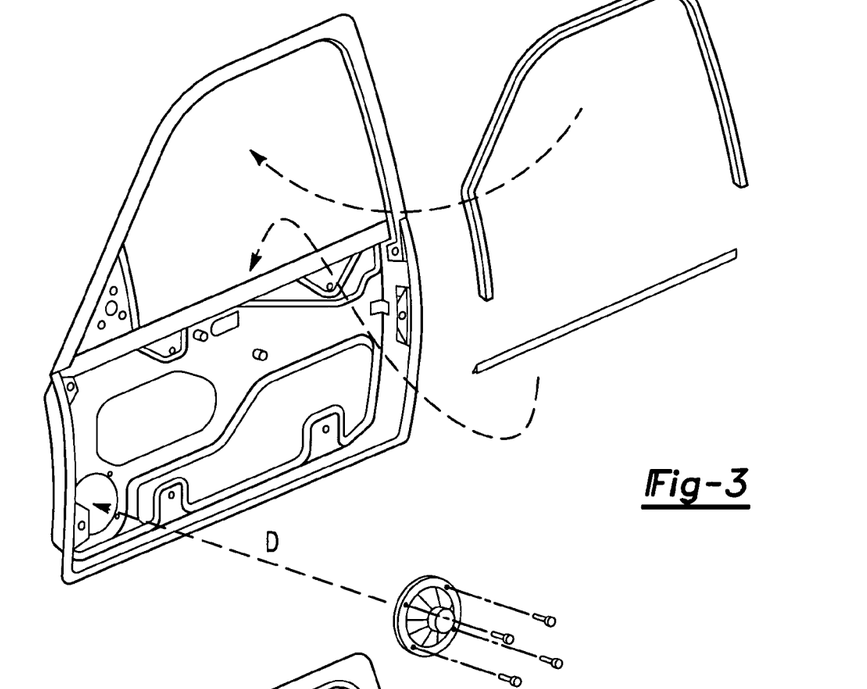
FIGS. 3 to 6 show one method of assembling the door of FIG. 1.

With reference to FIGS. 1 and 2, there is shown a door 30, in this case a front left hand door of a car (automobile). The door is assembled from various components including a door inner panel 31, a window regulator assembly 34, a combined anti-intrusion beam and waist reinforcement beam component 36 and a door outer panel 38. Inner panel 31 is in the form of a pressing having an outer face 40 which faces outwardly relative to an associated vehicle and an inner face 41 which faces inwardly relative to an associated vehicle.

Door inner panel 31 includes an upper window frame 42 and a lower portion 43 which together define a window aperture 44. The door inner panel 31 includes various fixing holes 45, a window regulator motor aperture 46, a loud speaker aperture 47, latch fixing holes 48, holes 49 and inside door release handle 50. Typically, the inner panel will include reinforcement (not shown) adjacent to front hinge points and also in the region of the latch. A window regulator assembly 34, the components of which are shown in FIG. 2, is assembled as a subassembly and this subassembly is then assembled towards the outer face 40 of the door inner panel 31 in the direction of arrow A.

Consideration of FIG. 2 shows the components of the window regulator assembly in detail. A window regulator carrier 1 is provided as a chassis or frame on which is mounted further components of the window regulator assembly. The carrier 1 is in the form of a pressing and includes an 'X' shaped portion having arms 52A, 52B, 52C and 52D which meet at a central region 53. Ends of arms 52A and 52B remote from central region 53 are connected by a substantially vertical portion 54 of the carrier 1. Similarly ends of arms 52C and 52D remote from the central region 53 are also connected by a substantially vertical portion 55.

Arms 52A, 52B, 52C and 52D are all generally elongate and U shaped in cross section as a result of the pressing process.

Carrier 1 includes holes 56 for mounting of the carrier, via fixing means which pass through hole 56 and through corresponding holes 45.

Carrier 1 further includes holes 57 for mounting of cable guides in the form of pulley wheels 4 via rivets 5.

Carrier 1 further includes mounting plate 57 upon which is mounted flexible latch support 18, mounting plate 58 upon which is mounted inner release handle assembly 19, and window regulator drive means plate in the form of a window regulator motor plate 59.

Motor plate 59 is generally planar in shape and is larger than window regulator motor aperture 46 so that seal 15 can provide for a moisture barrier between the interior of the door and the interior of the vehicle.

Motor plate 59 includes a cable drum housing 60.

Front rail 2 and rear rail 3 are mountable in spaced generally parallel relationship on portions 55 and 56 of carrier 1 respectively and guide cursors 13 and 14.

In further embodiments the front and rear rails could be integral with the carrier.

Two cable tensioner 6 and a bare cable separator 7 are also mounted on the carrier and will be further described below.

Window regulator motor 16 is mounted on motor plate 59 via fixing screws 17.

Latch assembly 20 is mounted on flexible latch support 18, which allows for slight adjustment in the position of latch assembly 20 relative to carrier 1 when the window regulator assembly is assembled into the door inner panel.

An inner release handle cable 21 connects inner release handle assembly 19 to latch assembly 20.

A sill button link rod 22 is connected to latch assembly 20 at one end and at another end is connected to a sill button 23.

An outer handle connection 29 operably connects the outer door handle with the latch assembly once the handle has been fitted.

A latch security shield 26 is provided above the latch assembly 20 to prevent unauthorised entry to the vehicle by the use of a 'slim Jim'.

A wiring harness 24 connects various electrical components of the window regulator assembly to the main wire harness of the vehicle (not shown).

For convenience the four pulley wheels 4 have been labelled as a first upper (1U), a first lower (1L), a second upper (2U) and a second lower (2L).

A bare cable assembly 62 is provided and includes a lower cable 11 which connects cable drum 8 to the front cursor 13, an upper cable 10 which connects the cable drum 8 to the rear cursor 14, and an intermediate cable 12 which connects the front cursor 13 to the rear cursor 14.

One end of lower cable 11 is wound around the threaded exterior of drum 8 and secured thereto.

One end of cable drum 8 is also wound around a different portion of the threaded exterior of cable drum 8 and secured thereto.

Window glass 25 includes fixings for securing the lower edge thereof to the front and rear cursors 13 and 14.

In use drum 8 is mounted on bush 9 in driving connection with motor 16.

Rotation of the drum 8 by the motor in one direction will cause lower cable 11 to be wound onto the drum and upper cable 10 wound off the drum causing cursors 13 and 14 and hence the window to lower.

Conversely, rotation of the drum in the opposite direction by the motor will cause upper cable 10 to be wound onto the drum and lower cable 11 to be wound off the drum resulting in raising of the window glass 25.

It can be seen that the upper cable 10, lower cable 11 and intermediate cable 12 define a cable path which runs between the various pulley wheels 4 and includes a first cable path portion connecting the first upper cable guide to the first lower cable guide, a second cable path portion connecting the second upper cable guide to the second lower cable guide, a first further cable path portion connecting the first upper cable guide to the second lower cable guide and a second further cable path portion connecting the first lower cable guide to the second upper cable guide. Note that the first and second cable path portions are substantially vertical and are substantially parallel to the front and rear rails 2 and 3 which define the direction of vertical movement of the window glass 25. Furthermore, the first further portion and second further portion together form a 'X' shape. Note that the second further portion is defined by the portion of the lower cable 11 running between the first lower cable guide and the drum (but not around the drum) in combination with that portion of the upper cable 10 running between the second upper cable guide and the drum (though not around the drum).

In view of the fact that the cable arrangement is a bare cable arrangement, it is necessary to ensure a minimum level of tension in all cables 10, 11 and 12 to ensure that they remain in place on appropriate pulley wheels and cable drum. Depending upon where the window glass is positioned e.g. fully closed with the glass in engagement with the glass run, part open, or fully open with part of the window regulator assembly being engaged with a lower stop, then this determines the various tension levels within the cables 10, 11 and 12, together with the two tensioner springs 6. In view of the fact that arms 52A, 52B, 52C and 52D extend to at least the mounting point of the pulley wheels 4 as do portions 54 and 55, then the carrier forms a triangulated structure at each of the pulley wheels where the tension in the cables 10, 11 and 12 is reacted.

In view of the fact that the first further and second further cable path portions cross and further in view of the fact that as cable drum 8 rotates and that portion of cable 10 which is being wound onto or off from the cable drum moves laterally relative to the door then it can be seen that advantageously a bare cable separator 7 can be mounted at the central region of the carrier 1 in order to guide cable 10 past cable 12 to ensure that they do not 'saw' against each during to the raising and lowering of the window glass 25.

The components as shown in FIG. 2 can all be pre-assembled to form the window regulator assembly 34.

Component 36 is formed as a single pressing and includes an anti intrusion beam 64 designed to prevent intrusion into the vehicle of parts of other vehicles and the like in the event of a road traffic accident.

The component 36 further includes a waist level reinforcement beam which in use supports the upper edge 38A of door outer panel 38 the other edges of door outer panel 38 being supported by the door inner panel.

The component 36 includes fixing holes 65 which cooperate with holes 49 and fixings 66 to secure the component 36 to the door inner panel 31, between leading edge 200 and trailing edge 204 of door inner panel 31 and vertically, intermediate of waistline 208 and bottom edge 212 of door inner panel 31.

One method of assembling the door 30 is as follows:

Inner panel 31 is placed horizontally on a jig such that inner face 41 faces downwards and outer face 40 faces upwards (through the door need not be assembled 'horizontally').

The inner waist line seal 69 and glass run 70 are moved to position (see arrows B and C) and secured on the door inner panel 31 at the periphery of the window aperture 44.

Loudspeaker 71 is moved to position (see arrow D) and is secured to the door inner panel 31 by four screws 72 which are tightened by the assembly operator from above i.e. in a direction facing the outer face 40 (when on the jig faces upwards).

The window regulator assembly 34 is then moved to position in the direction of arrow A and secured in place by screws (not shown) which are screwed into holes 45 from above. The component 36 is then moved to position in the direction of arrow E and fixings 66 are used to secure it to the door inner panel (as described above).

Outer waist line seal 73 is mounted on upper edge 38A of outer panel 38 and this subassembly is then moved in the direction of arrow F and is secured to the door inner panel 31.

In particular, it should be noted that the various components of the door are assembled from the outside and this is contrary to known assembly methods where such components are assembled into the door from the inside.

It should also be noted that in view of the motor plate 59 and seal 15, the motor 16 is on the 'dry' side of the door since any moisture or rain entering the lowering portion 43 of the door via the outer waist line seal 73 is prevented from progressing through aperture 46 by seal 15.

Figure 4:
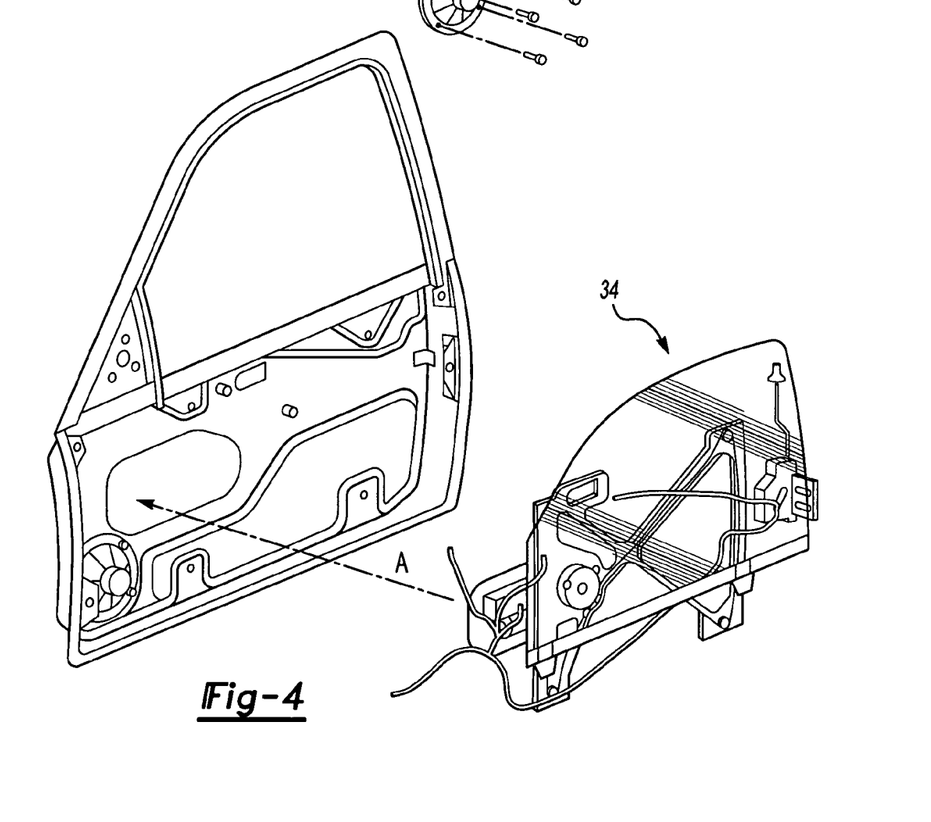
Figure 5:
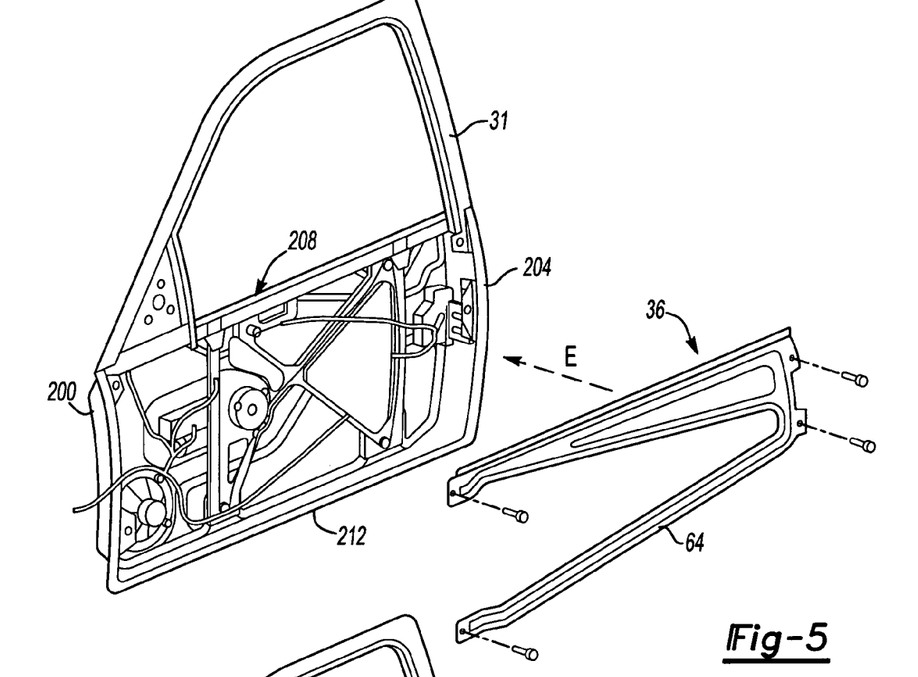
Figure 6:
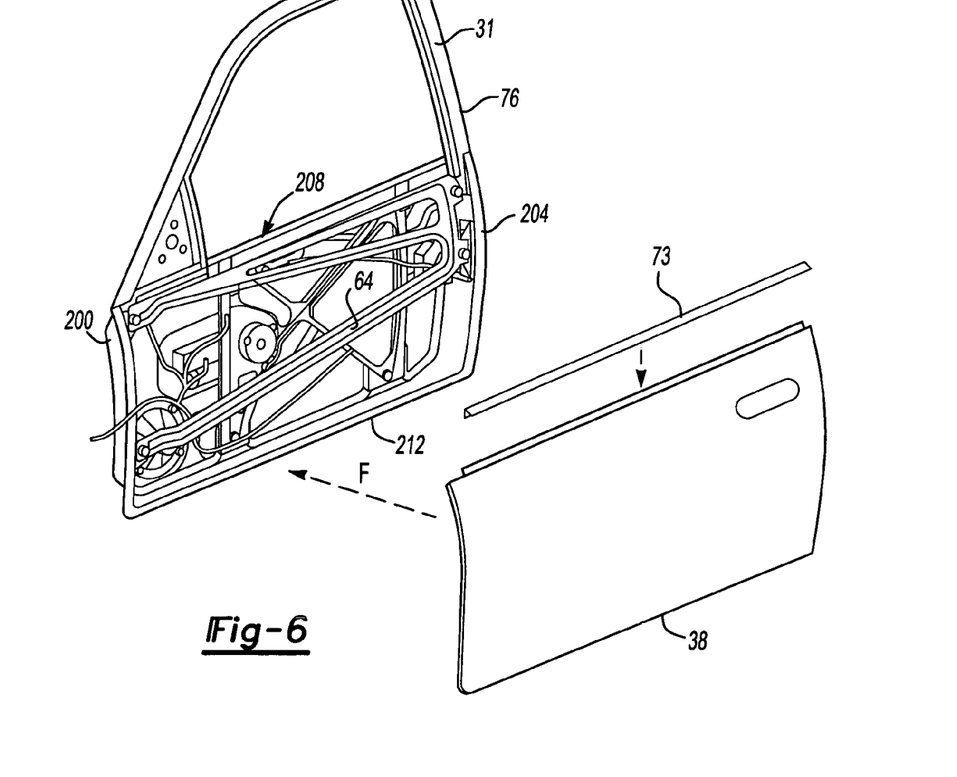

FIGS. 4 to 6 show the manner in which the door is assembled.

Figure 7:
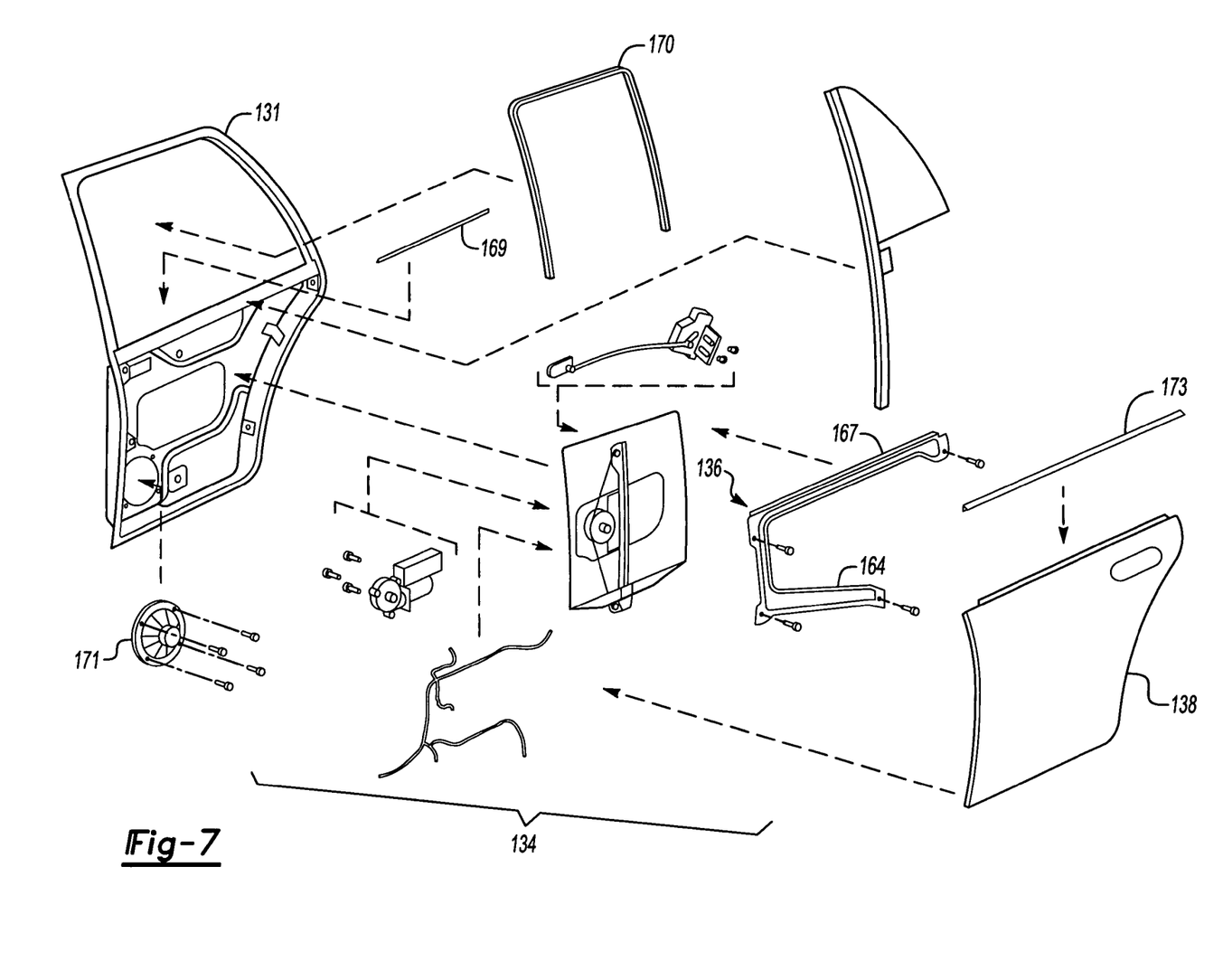
FIG. 7 shows a further embodiment of a door which can be assembled according to the present invention.

FIG. 7 shows a further embodiment of a vehicle door made according to the present invention, in which articles which perform substantially the same function as those in FIGS. 1 to 6 are labelled 100 greater.

In particular this embodiment shows a rear vehicle door. Various fixings can be used to secure the various components.

Bolts and screws and other similar threaded fasteners have an assembled axis e.g. the longitudinal axis of the bolt or screw. Furthermore they have an assembly direction defined by the bolt head or screw head. Thus, the assembly direction of a screw is from the screw head to the screw point. Thus, where such fixings are used, the assembly direction can be towards the outer face 40 i.e. inwardly relative to the associated vehicle.

Typically, known vehicle doors include fixings having assembly directions which are orientated outwardly relative to the vehicle.

In particular, bolts and screws are releasable fixing means.

An alternative fixing means which can be used is a pop rivet which also has an assembly axis and an assembly direction.

Alternative fixing means include adhesive bonding of one component to another or alternatively welding of one component to another.

Furthermore, a known method of securing an outer panel to an inner panel is to 'hem' the edge of the outer panel i.e. to deform it around the corresponding edge of the inner panel.

It should be noted that bolts and screws are generally removable so that components being secured by the bolts or screws can be separated without damage to either component. Furthermore, pop rivets can be drilled out in order to separate two components again without damage to either component.

Depending upon the design, the adhesive bond between two components can be broken without damage to either component.

However, welding of one component to another component provides a fixing means which prevents the components being separated without damage to one or other component Furthermore, where components are welded together, such welding techniques generate extreme amounts of heat and hence this is not a fixing technique which is suitable for refixing a component within a partially assembled door.

Similarly, where an outer panel has been hemmed onto an inner panel it is not possible to break the hemmed joint without damaging the outer panel such that it can no longer be reused. Advantageously, the fixing means used to secure the various door components allows the various door components to be non destructively separated and also reconnected.

It should be noted that the non destructive separating of components as mentioned herein refers to the non destruction of the components per se and not to be the non destruction of the fixing means. Thus, components fixed by an adhesive joint can be non destructively separated without damage to either component whilst nevertheless destroying the adhesive per se. Under these circumstances, new adhesive has to be used to reconnect the two components.

Where the door 30 has been assembled using non destructive type fixing means then it is possible to:
 a) remove a damaged outer panel and replace with a new outer panel,
 b) remove both a damaged outer panel and a damaged component 36 and replace with a new component 36 and new outer panel,
 c) remove an undamaged outer panel and remove an undamaged component 36 in order to gain access and repair other components of the door such as the window regulator assembly (and in particular replace a broken window glass), replace a damaged loudspeaker, or replace a damaged latch.

In further embodiments, the component 36 can be formed as a subassembly from an anti intrusion beam and a waist level reinforcement beam. As such in the event that just the anti intrusion beam is damaged then it can be replaced independently of the waist level reinforcement beam and vice versa.

It should be noted that loudspeaker 71 is secured by dedicated screws 72, that is to say, screws 72 secure only loudspeaker 71. Similarly, component 36 is secured by dedicated fixings 66. Similarly, window regulator assembly 34 is also secured by dedicated screws (not shown).

In further embodiments, a particular fixing means may be utilized to secure two components. Thus, for example, where the space between the aperture 46 and the aperture 47 is a limited, a loud speaker could be secured by three of the four screws 72 with the fourth screw being utilized to secure both the part of the window regulator assembly 34 and a part of the loud speaker 71. Thus, it can be seen that, depending upon the embodiment, various components can be assembled into place, whilst not being fully secured in place. The full securement in place only being possible once a further component has been added.

A car manufacturer is typically supplied with various car components by component suppliers. The components themselves can be individual items (such as nuts or bolts) or alternatively they can be subassemblies such as engines, gearboxes, axles, bonnets (hoods), boot lids (trunk lids), body shells or doors.

With regards to body hoods, trunks and doors, it is important that the exterior surfaces of these components, of a particular vehicle are all painted with paint from the same batch, in order to avoid slight variations in color.

Clearly, the major exterior colored surface of the door 30 is the exterior surface of the door outer panel 38. It is possible to paint the exterior surface of the upper window frame in a neutral color, such a black, without significantly affecting the exterior aesthetic appearance of the vehicle as a whole. Thus, an alternative method of assembling the door is as follows.

Figure 8:
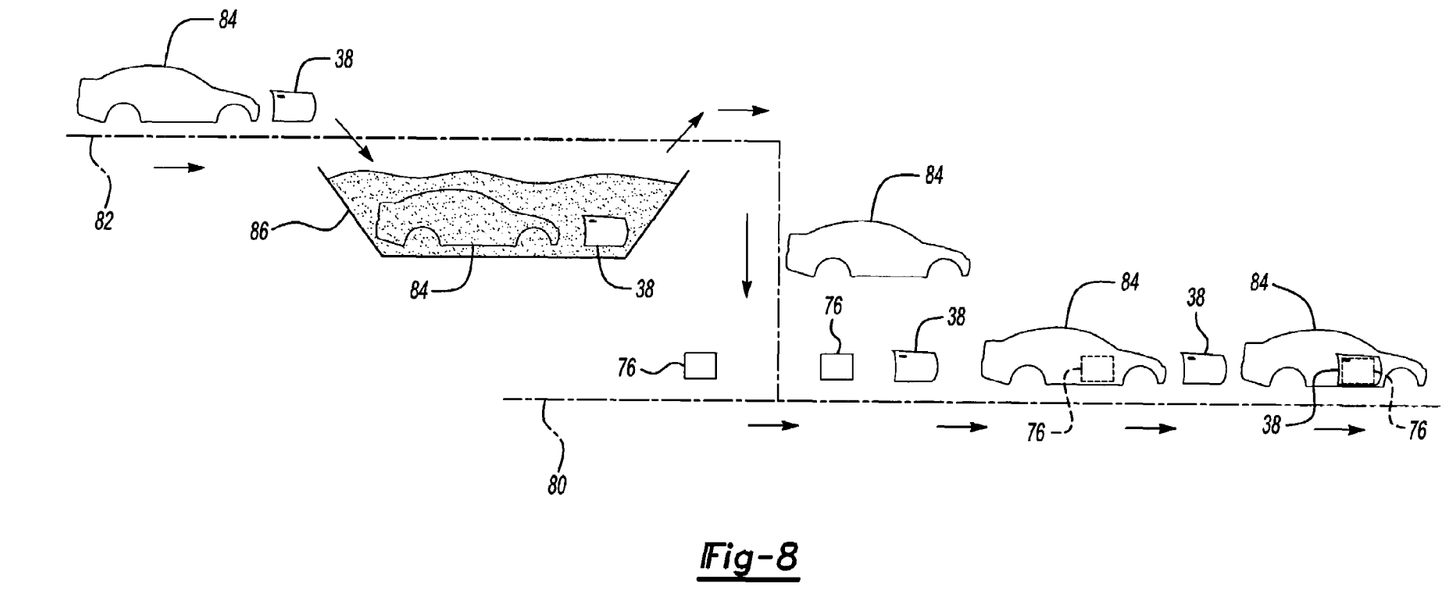
FIG. 8 shows a method of assembling the door on a vehicle body.

All of those components as shown in FIG. 5 can be assembled together to form a door subassembly 76 (see FIG. 6). As shown in FIG. 8, this can be carried out at a door manufacturers assembly line 80 (also known herein as a first assembly line).

The door outer panel 38 can be provided at the car manufacturers assembly line 82 (also known herein as a second assembly line) wherein it can be allocated to a specific car body shell 84 along with other doors and a hood and trunk. This set of components can then all be painted simultaneously with paint 86 from the same batch to ensure uniform color.

The door assembly 76 can then be transported from the door assembly line 80 to the vehicle assembly line 82 where the outer panel 38 can be assembled onto the door 76 and the door 76 can be assembled onto the associated vehicle. Note that the order in which the door outer skin is assembled on to the door and the door is assembled onto the associated vehicle can be carried out in either order.

Note that the door assembly 76 can have various levels of equipment e.g. with or without loudspeaker, with a window regulator motor or with a manual window regulator winder, with a manual only latch arrangement or with a electronic central door locking latch arrangement.

Furthermore, there may be several different types of door outer panel at the vehicle assembly line most notably outer panels of differing color e.g. red, green and blue but also outer panels of differing shapes for fitting onto different car models having a substantially common floor pan.

Furthermore there may be several different inner trim panels at the car assembly plant. Thus by way of example, if there are three different door subassemblies 76, four different outer panels 38 and five different inner trims panels, these can be 60 different door types (i.e., 3×4×5=60). It can be seen that where a door manufacturer has a first assembly line and a car manufacturer has a second assembly line the door manufacturer only has to supply three different types of doors to the car manufacturers assembly line. This has significant logistic advantages.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A method of assembling a door comprising the steps of:
   assembling a window regulator assembly and a window glass onto an outer face of a door inner panel, the door inner panel also including an inner face;
   assembling an anti intrusion beam directly onto the outer face of the door inner panel;
   assembling a door outer panel towards the outer face of the door inner panel; and
   securing by fixing the door inner panel, the window regulator assembly, the anti intrusion beam and the door outer panel relative to each other, wherein the step of assembling the window regulator assembly and the window glass precedes the step of assembling the anti instrusion beam, which precedes the step of assembling the door outer panel.

2. The method of claim 1 further including the step of assembling a trim panel towards the inner face of the door inner panel and securing the trim panel to the door inner panel.

3. The method of claim 1 wherein the step of securing by fixing comprises employing at least one fixing element which is assembled towards the outer face of the door inner panel.

4. The method of claim 3 wherein the at least one fixing element includes a primary axis which is substantially perpendicular to the outer face of the door inner panel.

5. The method of claim 4 wherein the step of securing by fixing comprises a primary fixing direction which faces the outer face of the door inner panel during assembly.

6. The method of claim 1 wherein the door outer panel, the anti intrusion beam and the window regulator assembly are non destructively releasably fixed to the door inner panel.

7. The method of claim 1 wherein the anti intrusion beam is configured to inhibit intrusion of other vehicles into a vehicle to which the door is fitted in an event of a road traffic accident.

8. The method of claim 1 wherein the door inner panel includes a leading edge, a trailing edge, a waist line and a bottom edge, and the anti intrusion beam is an elongate member assembled in the step of assembling the anti intrusion beam to extend generally between the leading edge and the trailing edge of the door inner panel intermediate the waist line and the bottom edge of the door inner panel.

9. The method of claim 1 wherein the anti intrusion beam is secured directly to the outer face of the door inner panel.

10. The method of claim 9 wherein the anti intrusion beam is secured by at least one fixing element attached to the outer face of the door inner panel.

11. The method of claim 10 wherein the anti intrusion beam is secured by the at least one fixing element assembled towards the outer face of the door inner panel.

12. The method of claim 1 further including the step of assembling the window regulator assembly and the window glass together before the step of assembling the window regulator assembly and the window glass onto the outer face of the door inner panel.

13. A method of assembling a door comprising the steps of:
    painting a door outer panel;
    assembling at least one functional component onto an outer face of a door inner panel, the door inner panel also including an inner face;
    assembling an anti intrusion beam onto the outer face of the door inner panel separately from other door components; and
    assembling the door outer panel towards the outer face of the door inner panel, wherein the step of assembling the anti intrusion beam precedes the step of assembling the door outer panel, and wherein the at least one functional component comprises at least one of a window regulator assembly, a loudspeaker and a latch assembly.

14. The method of assembly claim 13 wherein the anti intrusion beam is secured to the door inner panel prior to the step of assembling the door outer panel to the door inner panel and independently of the door outer panel.

15. The method of claim 13 wherein the and intrusion beam includes a waist level reinforcement beam integrally provided therewith.

16. The method of claim 13 wherein the anti intrusion beam is secured directly to the outer face of the door inner panel.

17. The method of claim 13 wherein the anti intrusion beam is assembled to the outer face of the door inner panel separately from the door outer panel.

18. The method of claim 17 wherein the anti intrusion beam is assembled to the outer face of the door inner panel prior to the step of assembling the door outer panel to the outer face of the door inner panel.

19. A method of assembling a door comprising the steps of:
    assembling at least one functional component onto an outer face of a door inner panel, wherein the door inner panel includes an inner face and door mountings to support the door in a vehicle;
    assembling an anti intrusion beam directly onto the outer face of the door inner panel;
    assembling a door outer panel towards the outer face of the door inner panel; and
    securing by fixing the door inner panel, the at least one functional component, the anti intrusion beam and the door outer panel relative to each other such that the door outer panel is supported entirely by the door inner panel when assembled in the vehicle, wherein the step of assembling the at least one functional component precedes the step of assembling the anti intrusion beam, which precedes the step of assembling the door outer panel.

* * * * *

UNITED STATES PATENT AND TRADEMARK OFFICE
CERTIFICATE OF CORRECTION

| | | |
|---|---|---|
| PATENT NO. | : 7,231,717 B2 | Page 1 of 1 |
| APPLICATION NO. | : 10/023479 | |
| DATED | : June 19, 2007 | |
| INVENTOR(S) | : Wurm et al. | |

It is certified that error appears in the above-identified patent and that said Letters Patent is hereby corrected as shown below:

Claim 15, Column 8, line 33: "and" should read as --anti--.

Signed and Sealed this

Twenty-first Day of August, 2007

JON W. DUDAS
*Director of the United States Patent and Trademark Office*